(12) United States Patent
Bigio et al.

(10) Patent No.: US 6,501,219 B1
(45) Date of Patent: Dec. 31, 2002

(54) SHATTER-RESISTANT INCANDESCENT LAMP, SILICONE COATING COMPOSITION, AND METHOD

(75) Inventors: Laurence Bigio, Schenectady, NY (US); Ferenc Horkay, Niskayuna, NY (US); Richard Joseph Uriarte, Clifton Park, NY (US); Richard Albert Striker, Midlothian, VA (US); Juliana Piukaso-Vich Reisman, Lyndhurst, OH (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/363,628

(22) Filed: Jul. 29, 1999

(51) Int. Cl.$^7$ .................................................. H01K 1/32
(52) U.S. Cl. ........................ 313/569; 525/478; 427/387; 313/634; 313/635; 313/578; 313/489; 313/315
(58) Field of Search ................................. 313/634, 635, 313/569, 578, 489, 315; 427/387; 525/478

(56) References Cited

U.S. PATENT DOCUMENTS

| | | |
|---|---|---|
| 2,676,182 A | 4/1954 | Daudt et al. |
| 3,159,601 A | 12/1964 | Ashby |
| 3,159,662 A | 12/1964 | Ashby |
| 3,220,972 A | 11/1965 | Lamoreaux |
| 3,529,035 A | 9/1970 | Lamoreaux |
| 3,715,232 A | 2/1973 | Audesse et al. |
| 3,775,452 A | 11/1973 | Karstedt |
| 3,814,730 A | 6/1974 | Karstedt |
| 3,884,866 A * | 5/1975 | Jeram et al. .................. 528/15 |
| 4,340,709 A * | 7/1982 | Jeram et al. .................. 528/15 |
| 4,535,141 A | 8/1985 | Kroupa |
| 4,845,164 A | 7/1989 | Gutek |
| 5,034,061 A | 7/1991 | Maguire et al. |
| 5,082,886 A * | 1/1992 | Jeram et al. ................. 524/403 |
| 5,252,683 A | 10/1993 | Murata et al. |

FOREIGN PATENT DOCUMENTS

| | | |
|---|---|---|
| CA | 914265 | 11/1972 |
| CA | 1243723 | 10/1988 |

* cited by examiner

*Primary Examiner*—Margaret G. Moore
(74) *Attorney, Agent, or Firm*—Bernadette M. Bennett; Noreen C. Johnson

(57) ABSTRACT

An environmentally favorable method is described for treating an incandescent lamp with a heat curable substantially organic solvent free silicone composition to improve the shatter resistance of the lamp.

11 Claims, 1 Drawing Sheet

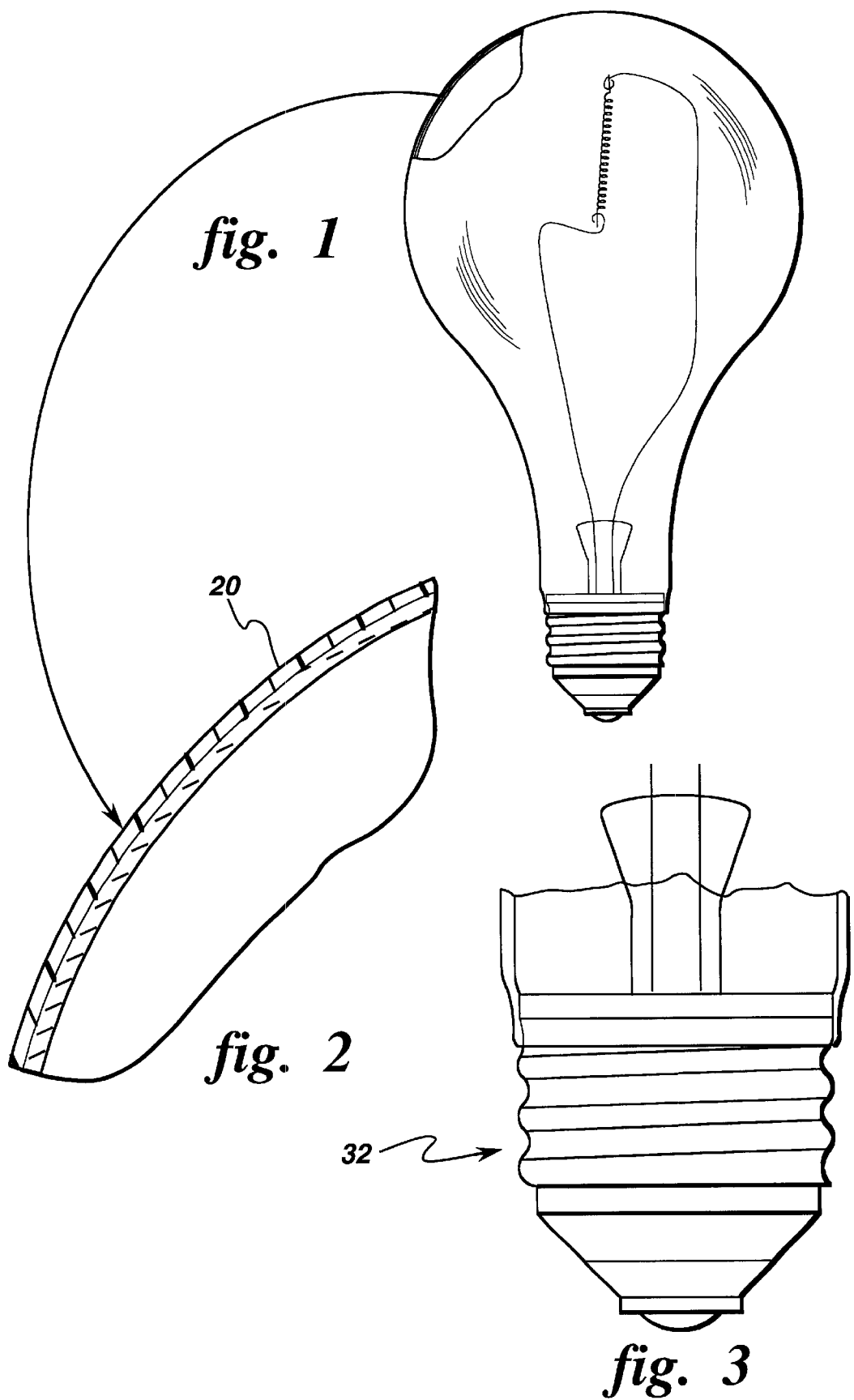

SHATTER-RESISTANT INCANDESCENT LAMP, SILICONE COATING COMPOSITION, AND METHOD

BACKGROUND OF THE INVENTION

The present invention relates to an environmentally safe method for applying a single coating of an optically clear transparent silicone containment composition onto the surface of an incandescent lamp bulb. More particularly, the present invention relates to a silicone coating composition useful for imparting shatter resistance to incandescent lamps and to shatter resistant lamps made thereby.

As shown by Robertson et al, Canadian Patent 914265, an incandescent lamp bulb is coated by dipping it into a silicone dispersion consisting of 75% of xylene and 25% silicone rubber. After treating the lamp, removal of excess solvent is necessary. In a related patent, U.S. Pat. No. 3,715,232, to Audesse et al, a method is described to make a shatter-resistant incandescent lamp, by initially coating the lamp bulb with an organic solvent silicone composition as shown by Robertson et al, followed by treating the coated lamp bulb surface with a solvent containing silicone overcoat.

Gagnon et al, Canadian Patent 1,243,723 is directed to an electric lamp having a pressurized light source capsule in a glass, light transmissive bulb. A containment coating is described for the bulb in the form of a fluoropolymer, such as Teflon resin of E. I. duPont de Nemours, or a multi-layer silicone rubber. It is reported that the silicone rubber multi-layer is applied by dip coating.

Lamoreaux U.S. Pat. No. 3,529,035, relates to high strength silicone elastomers. These silicone elastomers are formed by reacting a copolymer of $SiO_2$ units and $(CH_3)_2SiO$ units, in a toluene solvent, with a silanol end stopped polydimethylsiloxane in toluene. Reaction is effected with a catalyst in the form of an organic carboxylic acid salt of a metal, such as tin. Coating of an incandescent lamp bulb was achieved by dipping the lamp in the solvent blend, and upon lamp removal, allowing the solvent to evaporate from the treated bulb surface overnight. The silicone coating on the lamp's surface was then oven cured for 1 hour.

A transparent shatter-resistant platinum catalyzed silicone coating composition suitable for use on a glass surface is described by Maguire et al U.S. Pat. No. 5,034,061. An example of the Maguire et al composition includes the use of a 60% by weight in toluene solution of a benzene soluble copolymer of $SiO_2$ units and $(CH_3)_3SiO_{0.05}$ units, in combination with a siloxane hydride fluid and vinyldimethylsiloxane fluid.

While various silicone coating compositions are described in the prior art for treating the bulbs of incandescent lights to enhance their shatter resistance, significant environmental concerns have often been advanced as a result of the necessity of organic solvent disposal during the cure of the silicone coating composition. Alternative silicone coating compositions and methods for incandescent lamp treatment are therefore needed to offset such environmental concerns while continuing to maintain the physical properties of the applied silicone coating of interest to the incandescent lamp industry.

BRIEF SUMMARY OF THE INVENTION

The present invention is based on the discovery that a substantially organic solvent-free, platinum catalyzed heat curable silicone mixture, comprising by weight (a) a blend of a low molecular weight, and a high molecular weight vinyl containing polydimethylsiloxane fluid, (b) a siloxane hydride, and (c), a vinyl resin comprising chemically combined trimethylsiloxy units and $SiO_2$ units, can be used in an environmentally safe manner as an effective incandescent lamp bulb containment coating composition. The heat curable silicone composition has an extended shelf life, and can be applied as a single coating onto the surface of a lamp bulb by dip coating or spraying. Upon application and curing on the lamp bulb's surface, of the platinum catalyzed heat curable silicone mixture of the present invention, the lamp shows improved shatter resistance, weather resistance, and optical clarity.

In addition, if desired, a second substantially organic solvent-free heat curable platinum catalyzed silicone coating composition can optionally be applied at thicknesses up to about a mil onto the cured silicone treated lamp surface as a dust repellent. The dust repellent composition can comprise a platinum group metal catalyzed mixture of a vinyl resin comprising chemically combined dimethylvinylsiloxy units and $SiO_2$ units, a low molecular weight vinyl containing polydimethylsiloxane fluid, and a silicon hydride cross-linker.

In a further aspect of the present invention, there is included an incandescent lamp exhibiting improved containment of glass shards resulting from external impact. The incandescent lamp exhibiting improved impact resistance can be made by applying a single coating of the aforementioned heat curable platinum catalyzed silicone coating composition onto the incandescent lamp's glass bulb surface, extending beyond the hermetic seal between the glass bulb and the metallic base. Preferably, application of the silicone composition onto the surface of the incandescent lamp's metallic base can extend up to the threaded portion.

SUMMARY OF THE INVENTION

A substantially volatile organic solvent-free, platinum group metal catalyzed, heat curable silicone coating composition comprising by weight, (a) 100 parts of an alkenyl terminated polydiorganosiloxane mixture consisting essentially of a (i) a low molecular weight alkenyl terminated polydiorganosiloxane having a viscosity of about 500 centipoise to about 15000 centipoise at 25° C. and (ii) a high molecular weight alkenyl terminated polydiorganosiloxane having a viscosity of about 40,000 centipoise to about 220,000 centipoise at 25° C., where there can be present by in the alkenyl terminated polydiorganosiloxane mixture, from about 0.02 to 0.5 part of (i), per part of (ii), (b) 5 to 50 parts of a silicone resin, referred to hereinafter sometimes as MQ, or MQD, having ratio of organo radicals to silicon which has a value of about 0.5 to 2, where the organo radicals are selected from the group consisting of $C_{(1-6)}$ organo radicals, $C_{(2-6)}$ alkenyl radicals, and a mixture thereof, and the silicone resin comprises "Q" units having the formula, $$SiO_2,$$

chemically combined with a member selected from the group consisting of "M" units having the formula, $$(R)_a(R^1)_bSiO_{0.5},$$

and a mixture of M units and "D" units having the formula, $$(R^2)_2SiO,$$

where R is a $C_{(1-6)}$ organo radical, $R^1$ is a $C_{(2-6)}$ alkenyl radical, $R^2$ is selected from R, $R^1$, and a mixture thereof, "a" is an integer having a value of 2 or 3, "b" is a whole number having a value of 0 or 1, and the sum of a+b is equal to 3, referred to hereinafter sometimes as an "MQ", or "MQD" resin, (c) 0.1 to 10 parts of a silicon hydride cross-linking agent, and, (d) an effective amount of an inhibited platinum group metal catalyst.

An environmentally favorable method for making a shatter resistant incandescent lamp having a substantially transparent tack-free silicone coating on the incandescent lamp bulb, comprising the steps of:

(1) treating the surface of the bulb of the incandescent lamp with the above described substantially volatile organic solvent-free, platinum group metal catalyzed, heat curable silicone coating composition comprising (a),(b), (c) and (d) above, and (2) heating the treated incandescent lamp at a temperature in the range of about 100° C. to about 180° C. until the silicone treated incandescent lamp bulb surface is substantially tack-free.

An environmentally favorable method for making a shatter resistant incandescent lamp having a substantially transparent dust repellent tack-free silicone coating on the surface of its bulb, comprising the steps of:

(1) treating the surface of the incandescent lamp bulb with the substantially volatile organic solvent-free, platinum group metal catalyzed, heat curable silicone coating composition comprising (a),(b), (c) and (d) above, (2) heating the treated incandescent lamp at a temperature in the range of about 100° C. to about 200° C. until the silicone treated incandescent lamp bulb surface is substantially tack-free, (3) applying to the resulting substantially tack-free silicone coated shatter resistant bulb surface, a substantially volatile organic solvent-free, platinum group metal catalyzed, heat curable silicone coating composition comprising by weight, (e) an alkenyl terminated polydiorganosiloxane mixture consisting essentially of a low molecular weight alkenyl terminated polydiorganosiloxane having a viscosity of about 20 centipoise to about 500 centipoise at 25° C., (f) 0.5 to about 2 parts, per part of (e), of an MQ, or MQD resin, (g) 0.005 part to 0.1 part, per part of (e), of a silicon hydride cross linker, and (h) an effective amount of an inhibited platinum group metal catalyst, and, (4) heating the silicone treated incandescent lamp at a temperature in the range of 100° C. to 180° C., and preferably, 130° C. to 150° C., until the surface of the silicone treated incandescent lamp bulb is substantially tack-free.

An incandescent lamp having improved shatter resistance comprising a glass envelope and a metallic base, where the glass envelope and a portion of the metallic base is coated with a cured tack-free substantially transparent homogenous silicone coating composition comprising the heat cured reaction product of a mixture comprising a substantially volatile organic solvent-free, platinum group metal catalyzed, heat curable silicone coating composition comprising by weight, (a),(b), (c) and (d) above.

DETAILED DESCRIPTION OF THE INVENTION

The substantially volatile organic solvent-free platinum group metal catalyzed heat curable silicone composition, or "silicone coating composition" of the present invention can be made by blending together in a suitable mixer, the alkenyl terminated polydiorganosiloxane fluids with the MQ or MQD resin dissolved in an organic solvent, for example xylene, or toluene. The silicone blend is then stripped of organic solvent in a suitable manner.

The resulting silicone mixture can then be divided into two parts, for example A and B. In part A, there can be added an effective amount of the platinum group metal catalyst, and thereafter the mixture can be homogenized in a suitable manner. In part B, there can be added the silicon hydride cross-linker. An effective amount of a suitable platinum group metal inhibitor and a heat stabilizer also can be added to either mixture A or B. Prior to lamp application, parts A and B are thoroughly mixed.

The alkenyl terminated polydiorganosiloxane fluids consist essentially of chemically combined diorganosiloxy units having terminal $R^1(R)_2SiO$ units, where R, and $R^1$ are as previously defined. Preferably, the alkenyl terminated polydiorganosiloxane fluids or "vinylsiloxanes" of the present invention have terminal siloxy units of the formula, $$C_2H_3(CH_3)_2SiO_2,$$

and consist essentially of chemically combined dimethylsiloxy units. The vinylsiloxane fluids can have a vinyl content of about 0.05 to about 3.5 mole percent, and preferably 0.14 to about 2 mole percent based on the total siloxy units having one or more organo radicals as defined hereinafter attached to silicon by carbon-silicon bonds. Alkenyl substitution also can occur on the polymer backbone. Organo radicals include methyl, ethyl, propyl, butyl, perfluoropropyl, phenyl, and cyanoethyl.

The alkenyl terminated polydiorganosiloxane fluids can be made by equilibrating a cyclotetrasiloxane with a low molecular weight alkenyl terminated chain-stopper. A mild acid catalyst such as a sulfuric acid activated clay can be used. The resulting silicone fluid can be neutralized with a base catalyst such as sodium hydroxide. By varying the level of chain-stopper, the viscosity of the alkenyl terminated polydiorganosiloxane fluid can be adjusted to the desired range.

The silicon hydride cross-linker, or "siloxane hydride" can have about 0.04% to about 1.4% by weight of chemically combined hydrogen attached to silicon based on total weight of siloxane hydride. A preferred variety of siloxane hydride can be made by a hydrolysis process or an acid catalyzed equilibration process. In the equilibration process, the appropriate cyclotetrasiloxane is equilibrated with a low molecular weight hydrogen terminated chain-stopper, such as a 1,3-dihydrogentetraorganodisiloxane. In the hydrolysis process, an appropriate hydrogendiorganochlorosilane is hydrolyzed with the desired level of diorganodichlorosilane. Undesirable cyclics can be removed by stripping.

The MQ, or MQD resin which is included within the present invention, are organic solvent dispersible, organic solvent hydrolyzates. A sodium silicate solution can be reacted under acidic conditions with a source of triorganosiloxy units, such as a hexaorganodisiloxane, for example hexamethyldisiloxane, or bis(dimethyl-vinyl)disiloxane, followed by recovering an organic solvent dispersible siloxane hydrolyzate. A suitable procedure for making the MQ, or MQD resin is further shown in Daudt, U.S. Pat. No. 2,676,182.

Various complexes can be used as the platinum group metal catalyst for the thermally-activated addition reaction between the vinyl siloxane and the silicon hydride cross-linker. Some of the platinum group metal complexes which can be used as catalysts include complexes of rhodium, ruthenium, palladium, and platinum. Some of these platinum group metal catalysts are shown in U.S. Pat. Nos. 3,159,601, 3,159,662 to Ashby; platinum alcoholate catalysts described in U.S. Pat. No. 3,220,972 and U.S. Pat. No. 3,814,730 to Karstedt. An effective amount of platinum catalyst is an amount which is sufficient to provide from about 5 ppm to about 200 ppm of platinum, and preferably, 10 ppm to 100 ppm, based on the total weight of the substantially volatile organic solvent-free platinum group metal catalyzed heat curable silicone composition.

In addition to platinum group metal catalysts, catalyst inhibitors can be used at about 100 ppm to about 1000 ppm to extend the pot-life of the heat curable substantially volatile organic solvent-free platinum group metal catalyzed composition. Some of these inhibitors include acetylenic compounds, for example alcohols, described in U.S. Pat. No. 4,603,168; dicarboxylate in U.S. Pat. No. 4,943,601 and maleates, for example, bis-3,trimethoxysilylpropylmaleate, in U.S. Pat. No. 4,783,552. Further, the silicone coating composition of the present invention can have a heat stabilizer, such as a copper salt of naphthenic acid.

BRIEF DESCRIPTION OF THE DRAWINGS

In order to further understand the practice of the invention, reference is made to the drawing.

FIG. 1 shows an incandescent lamp having a cutaway section shown by FIG. 2. In FIG. 3 there is shown a cutaway of the base section of FIG. 1.

In FIG. 2, there is shown at 20, a silicone coating having a thickness of about 3 to 15 mils on the surface of the glass envelope.

In FIG. 3, there is shown a silicone coating extending beyond the glass hermetic seal for a distance of about 40 to 200 mil onto the metal base at 32.

In order that those skilled in the art will be better able to practice the present invention, the following example is given by way of illustration, and not by weigh of limitation. All parts are by weight unless otherwise indicated.

EXAMPLE

A vinyl terminated polydimethylsiloxane fluid having a viscosity of about 80,000 centipoise is prepared by equilibrating over a period of about 8 hours at a temperature of 155° C. in the presence of 10–20 ppm of KOH, a mixture consisting essentially of about 2.3 parts of 1,3-divinyltetramethyldisiloxane, per 1000 parts of octamethyl-cyclotetrasiloxane. In a similar manner, a vinyl terminated polydimethylsiloxane fluid having a viscosity of about 3500 centipoise is prepared by equilibrating a mixture of about 6.1 parts of 1,3-divinyltetramethyldisiloxane, per 1000 parts of octamethyl-cyclotetrasiloxane over a period of 10–15 hours.

A blend is prepared consisting essentially of 0.2 part of the vinyl terminated polydimethylsiloxane fluid having a viscosity of about 3500 centipoise at 25° C., per part of the vinyl terminated polydimethylsiloxane fluid having a viscosity of about 80,000 centipoise at 25° C. The resulting fluid blend having a viscosity of about 50,000 centipoise is then further mixed thoroughly mixed with an MQD resin dissolved in xylene to form a mixture having a proportion of about 3 parts of vinyl siloxane fluid blend, per part of MQD resin (based on dry weight). The xylene is then stripped from the mixture in a controlled manner to produce a silicone mixture free of volatile organic compounds (VOC).

The above solvent free silicone mixture is divided into two equal parts referred to hereinafter as part A and part B.

There is added to 100 g of part A, 0.1 g of a platinum catalyst solution shown by Karstedt U.S. Pat. No. 3,775,452, 0.2 g of diallylmaleate inhibitor, and 0.5 g of a heat stabilizer (copper salt of naphthenic acid). The resulting mixture is homogenized for 20 minutes.

There is added to 100 g of part B, 2 g of a polymethyl-hydrogensiloxane cross-linking agent consisting essentially of condensed methylhydrogensiloxy units, dimethylsiloxy units and terminated with trimethylsiloxy units having a viscosity of about 15 centipoise at 25° C. The resulting part B mixture is mixed for 20 minutes.

A heat curable, sprayable, and dipable silicone mixture, free of volatile organic compounds (VOC), is prepared by thoroughly mixing part A and part B. Five 75 watt GE incandescent lamps manufactured at Nela Park, Cleveland Ohio, are dipped into the silicone mixture and removed. The treated lamps are mounted and placed into an oven for 3 minutes at 135° C. Tack-free coatings having an average thickness of 3 to 15 mils are obtained on the respective light bulbs. The respective light outputs for each of the lamps with and without the applied silicone coating are measured. The light output in lumens is found to drop an average of about 2.5% as a result of the silicone coating.

The physical properties of several cured test samples are prepared from the above described silicone heat curable mixture. The physicals are measured after a 3 minute cure at 135° C. There is obtained an average value showing a tensile (psi) of about 630, an elongation at break of 440% and a durometer of 44. A significant change in the physicals are found if the proportion of the low and high molecular weight vinyl siloxanes are varied between 10 to 90, and 50/50 respectively.

Several GE incandescent lamps are treated with the above described heat curable silicone mixture and thereafter oven cured following the same procedure. The lamps are then evaluated for shatter resistance. Some of the lamps are treated as shown in FIG. 1, whereby the cured silicone coating extends beyond the hermetic seal at the juncture of the glass envelope and onto the metal base and included a portion of the upper threaded screw area. Other GE incandescent lamps are similarly treated, but the curable silicone mixture is restricted to the glass envelope and does not extend onto the metal base.

Lamp shatter resistance is based on the use of a pendulum apparatus having an aluminum mallet. A lamp is positioned in an energized socket at the rest point of the pendulum. The lamp is burned until it reaches normal operating temperatures. At that point, the mallet is released and allowed to swing one or more times through a pre-ordained angle to strike the lamp. The pendulum apparatus is adjusted with respect to the angle of elevation of the pendulum bob to provide a force at impact at about the juncture of the glass envelope and the metal base which is at least sufficient to crack the glass envelope. Once the bulb has been broken, the lamp can be unscrewed and evaluated for glass containment.

Several lamps are evaluated for glass containment using the above test. It is found that the lamps treated with the heat curable silicone composition in accordance with the present invention show at least 90% containment based on visual observation. In addition, lamps coated with the heat cured silicone composition below the glass-metal hermetic seal onto the metal base as shown in FIG. 3, exhibit a substantially improved reduction in glass loss upon lamp fracture, as compared to lamps coated with various glass containment coating restricted to the glass surface.

Although the above example is directed to the use of only a few of the very many silicone coating compositions which can be used in the practice of the present invention, it should be understood that the present invention is directed to a much broader variety of materials and methods as set forth in the description preceding this description.

What is claimed is:

1. An environmentally favorable method for making a shatter resistant incandescent lamp having a substantially transparent tack-free silicone coating on the incandescent lamp bulb, comprising the steps of:
   (I) treating the surface of the bulb of the incandescent lamp with the substantially volatile organic solvent-free, platinum group metal catalyzed, heat curable silicone coating composition comprising by weight,
      (a) 100 parts of an alkenyl-terminated polydiorganosiloxane mixture consisting essentially of (i) a low molecular weight alkenyl-terminated polydiorganosiloxane having a viscosity of about 500 centipoise to about 15000 centipoise at 25° C. and (ii) a high molecular weight alkenyl-terminated polydiorganosiloxane having a viscosity of about 40,000 centipoise to about 220,000 centipoise at 25° C., where there can be present in the alkenyl-terminated polydiorganosiloxane mixture from about 0.02 to 0.5 part of (i), per part of (ii),
      (b) 5 to 50 parts of a silicone resin having a ratio of organo radicals to silicon which has a value of about 0.5 to 2, where the organo radicals are selected from the group consisting of $C_{(1-6)}$ organo radicals, $C_{(2-6)}$ alkenyl radicals, and a mixture thereof, and the silicone resin comprises "Q" units having the formula, $SiO_2$, chemically combined with a member selected from the group consisting of "M" units having the formula, $(R)_a(R^1)_b SiO_{0.5}$, and a mixture of "M" units and "D" units having the formula, $(R^2)_2 SiO$, where R is a $C_{(1-6)}$ organo radical, $R^1$ is a $C_{(2-6)}$ alkenyl radical, $R^2$ is selected from R, $R^1$, and a mixture thereof, "a" is an integer having a value of 2 or 3, "b" is a whole number having a value of 0 or 1, and the sum of a+b is equal to 3,
      (c) 0.1 to 10 parts of a silicon hydride cross-linking agent, and,
      (d) an effective amount of an inhibited platinum group metal catalyst; and
   (II) heating the. treated incandescent lamp at a temperature in the range about 100° C. to about 200° C. until the silicone treated incandescent lamp bulb surface is substantially tack-free.

2. The environmentally favorable method in accordance with claim 1, where the alkenyl-terminated polydiorganosiloxane. mixture consists essentially of a mixture of vinyl-terminated polydimethylsiloxanes.

3. The environmentally favorable method in accordance with claim 1, where the silicone resin is a methylvinylsiloxane.

4. The environmentally favorable method in accordance with claim 1, where the platinum group metal catalyst is a platinum catalyst.

5. The environmentally favorable method in accordance with claim 1, where the platinum catalyst is hexachloroplatinic acid hydrate.

6. The environmentally favorable method in accordance with claim 1, where the platinum group metal inhibitor is diallylmaleate.

7. The environmentally favorable method in accordance with claim 1, where the silicon hydride cross-linking agent is polymethylhydrogensiloxane.

8. An environmentally favorable method for making a shatter resistant incandescent lamp having a substantially transparent tack-free silicone coating on the incandescent lamp bulb, comprising the steps of:
   (I) treating the surface of the bulb of the incandescent lamp with the substantially volatile organic solvent-free, platinum group metal catalyzed, heat curable silicone coating composition comprising by weight,
      (a) 100 parts of an vinyl-terminated polydiorganosiloxand mixture consisting essentially of (i) a low molecular weight vinyl-terminated polydiorganosiloxane having a viscosity of about 500 centipoise to about 15000 centipoise at 25° C. and (ii) a high molecular weight vinyl-terminated polydiorganosiloxane having a viscosity of about 40,000 centipoise to about 220,000 centipoise at 25° C., where there can be present in the vinyl-terminated polydiorganosiloxane mixture from about 0.02 to 0.5 part of (i), per part of (ii),
      (b) 5 to 50 parts of methylvinylsiloxane,
      (c) 0.1 to 10 parts of polymethylhydrogensiloxane, and
      (d) an effective amount of hexachloroplatinic acid hydrate and diallylmaleate; and
   (II) heating the treated incandescent lamp at a temperature in the range of about 100° C. to about 200° C. until the silicone treated incandescent lamp bulb surface is substantially tack-free.

9. An environmentally favorable method for making a shatter resistant incandescent lamp having a substantially transparent dust repellent tack-free silicone coating on the surface of its bulb, comprising the steps of:
   (I) treating the surface of the incandescent lamp bulb with the substantially volatile organic solvent-free, platinum group metal catalyzed, heat curable silicone coating composition comprising by weight,
      (a) 100 parts of an alkenyl-terminated polydiorganosiloxane mixture consisting essentially of (i) a low molecular weight alkenyl-terminated polydiorganosiloxane having a viscosity of about 500 centipoise to about 15000 centipoise at 25° C. and (ii) a high molecular weight alkenyl-terminated polydiorganosiloxane having a viscosity of about 40,000 centipoise to about 220,000 centipoise at 25° C., where there can be present in the alkenyl-terminated polydiorganosiloxane mixture from about 0.02 to 0.5 part of (i), per part of (ii),
      (b) 5 to 50 parts of a silicone resin having a ratio of organo radicals to silicon which has a value of about 0.5 to 2, where the organo radicals are selected from the group consisting of $C_{(1-6)}$ organo radicals, $C_{(2-6)}$ alkenyl radicals, and a mixture thereof, and the silicone resin comprises "Q" units having the formula, $SiO_2$, chemically combined with a member selected from the group consisting of "M" units having the formula, $(R)_a(R^1)_b SiO_{0.5}$, and a mixture of "M" units and "D" units having the formula, $(R^2)_2 SiO$, where R is a $C_{(1-6)}$ organo radical, $R^1$ is a $C_{(2-6)}$ alkenyl radical $R^2$ selected from R, $R^1$, and a mixture thereof, "a" is an integer having a value of 2 or 3, "b" is a whole number having a value of 0 or 1, and the sum of a+b is equal to 3, (c) 0.1 to 10 parts of a silicon hydride cross-linking agent, and, (d) an effective amount of an inhibited platinum group metal catalyst; and, (II) heating the treated incandescent lamp at a temperature in the range of about 100° C. to about 200° C. until the silicone treated incandescent lamp bulb surface is substantially tack-free, (III) applying to the resulting substantially tack-free silicone coated shatter resistant bulb surface, a substantially volatile organic solvent-free, platinum group metal catalyzed, heat curable silicone coating composition comprising by weight, (e) an alkenyl-terminated polydiorganosiloxane mixture consisting essentially of a low molecular weight alkenyl-terminated polydiorganosiloxane having a viscosity of about 20 centipoise to about 500 centipoise at 25° C., (f) about 0.5 part to about 2 parts, per part of (e), of a silicone resin having a ratio of organo radicals to silicon with a value of 0.5 to 2, where the organo radicals are selected from the group consisting of $C_{(1-6)}$ organo radicals, $C_{(2-6)}$ alkenyl radicals, and a mixture thereof, and the silicone resin comprises "Q" units having the formula, $SiO_2$, chemically combined with a member selected from the group consisting of "M" units having the formula, $(R)_a(R^1)_b SiO_{0.5}$, and a mixture of "M" units and "D" units having the formula, $(R^2)_2 SiO$, where R is a $C_{(1-6)}$ organo radical, $R^1$ is a $C_{(2-6)}$ alkenyl radical, $R^2$ is selected from R or $R^1$, "a" is an integer having a value of 2 or 3, "b" is a whole number having a value of 0 or 1, and the sum of a+b is equal to 3, (g) 0.005 part to about 0.1 part, per part of (e), of a silicon hydride cross-linker, and, (h) an effective amount of an inhibited platinum group metal catalyst, and, (IV) heating the silicone treated incandescent lamp at a temperature in the range of about 100° C. to about 200° C. until the surface of the silicone treated incandescent lamp bulb is substantially tack-free.

10. A shatter resistant incandescent lamp comprising a globular glass envelope and a threaded metal base, which shatter resistant incandescent lamp is coated with a cured, tack-free, substantially transparent silicone coating comprising the heat cured product of reaction of a substantially volatile organic solvent-free, platinum group metal catalyzed, heat curable silicone coating composition comprising by weight, (a) 100 parts of an alkenyl-terminated polydiorganosiloxane mixture consisting essentially of (i) a low molecular weight alkenyl-terminated polydiorganosiloxane having a viscosity of about 500 centipoise to about 15000 centipoise at 25° C. and (ii) a high molecular weight alkenyl-terminated polydiorganosiloxane having a viscosity of about 40,000 centipoise to about 220,000 centipoise at 25° C., where there can be present in the alkenyl-terminated polydiorganosiloxane mixture from about 0.02 to 0.5 part of (i), per part of (ii), (b) 5 to 50 parts of a silicone resin having a ratio of organo radicals to silicon which has a value of about 0.5 to 2, where the organo radicals are selected from the group consisting of $C_{(1-6)}$ organo radicals, $C_{(2-6)}$ alkenyl radicals, and a mixture thereof, and the silicone resin comprises "Q" units having the formula, $SiO_2$, chemically combined with a member selected from the group consisting of "M" units having the formula, $(R)_a(R^1)_b SiO_{0.5}$, and a mixture of "M" units and "D" units having the formula, $(R^2)_2 SiO$, where R is a $C_{(1-6)}$ organo radical, $R^1$ is a $C_{(2-6)}$ alkenyl radical, $R^2$ is selected from R, $R^1$, and a mixture thereof, "a" is an integer having a value of 2 or 3, "b" is a whole number having a value of 0 or 1, and the sum of a+b is equal to 3, (c) 0.1 to 10 parts of a silicon hydride cross-linking agent, and, (d) an effective amount of an inhibited platinum group metal catalyst.

11. The shatter resistant incandescent lamp in accordance with claim 10, where the cured tack-free substantially transparent silicone coating composition extends onto the threaded metal base.

* * * * *